United States Patent [19]

Palmersten

[11] Patent Number: 5,343,665
[45] Date of Patent: Sep. 6, 1994

[54] CABANA PANELS HAVING ADJUSTABLE-STRENGTH INTERLOCKING MEANS

[75] Inventor: Michael J. Palmersten, Safety Harbor, Fla.

[73] Assignee: Ramp R & D, Ormond, Fla.

[21] Appl. No.: 84,035

[22] Filed: Jun. 28, 1993

[51] Int. Cl.$^5$ .............................................. E04C 3/30
[52] U.S. Cl. .................. 52/588.1; 52/586.1
[58] Field of Search ............... 52/588, 595, 578, 581, 52/584, 593

[56] References Cited

U.S. PATENT DOCUMENTS

| | | | |
|---|---|---|---|
| 3,625,808 | 12/1971 | Martin | 52/595 X |
| 3,667,180 | 6/1972 | Tischuk | 52/595 X |
| 4,122,641 | 10/1978 | Bard et al. | 52/595 X |
| 4,769,963 | 9/1988 | Meyerson | 52/588 X |
| 4,998,396 | 3/1991 | Palmersten | 52/588 X |
| 5,138,812 | 8/1992 | Palmersten | 52/588 X |

Primary Examiner—Carl D. Friedman
Assistant Examiner—Creighton Smith
Attorney, Agent, or Firm—Joseph C. Mason, Jr.; Ronald E. Smith

[57] ABSTRACT

Modular building panels having foam cores protected by metal skins are releasably interconnected in edge-to-edge relation to one another. The interconnection is accomplished by bending the metal skins that protect the top and bottom surfaces of the core into complementary shapes so that contiguous panels are snap fit together when the bent metal skins are interlocked with one another. In some embodiments, the cores are grooved and the flexibility of the interlocking members is increased by decreasing the depth of the grooves and the flexibility is decreased by increasing the depths of those grooves because decreasing the groove depth provides less support for the interlocking members and allows them to displace more during the interlocking procedure and increasing the depth increases the support and thus limits their movement. The interconnecting members are flexible and resilient so that they reassume their initial positions of repose after being transiently displaced from such positions during the interlocking procedure. The configuration of the interlocking members aligns the skins with respect to the cores during the adhesive curing process and shields caulking compound from sunlight when the panel edges are joined to one another.

8 Claims, 7 Drawing Sheets

CABANA PANELS HAVING ADJUSTABLE-STRENGTH INTERLOCKING MEANS

BACKGROUND OF THE INVENTION

1. Field of the invention

This invention relates to modular cabana panels of the type having metal skins that cover the top and bottom surfaces of an expanded polystyrene core. More particularly, it relates to snap lock designs that facilitate the construction of a roof or wall with said panels.

2. Description of the prior art

Roofs or walls made of expanded polystyrene (EPS) modular panels are popular in the construction industry because they insulate well, are light in weight, and are easy to install because of their modular form.

EPS is a soft, easily damaged material. Accordingly, the top and bottom surfaces of the EPS core are usually covered by a thin skin of sheet metal; the sheet metal is bonded to the core by a suitable adhesive means. The metal sheets protect the core from abrasion and, advantageously, contiguous edges thereof may be bent into complementally interlocking forms to provide a means for interlocking abutting edges of the panels.

In many designs, the edges of the EPS core are also sculpted to provide supplemental interlocking means. In those designs, a groove may be formed in the edge of one panel and a corresponding tongue may be formed in the edge of an abutting panel. Thus, in a typical roof made of interlocked modular panels of the metal skin-covered EPS type, both the abutting foam cores and the contiguous metal skins are interlocked with one another.

All of the designs are intended to facilitate the interlocking of the panels at the time the roof is laid down, and to provide as near a seamless fit as possible to inhibit to the greatest extent possible the intrusion of moisture into the space between the panels. However, most contractors use a caulking compound to seal the seam between the panels, regardless of how tightly fit together the contiguous interlocking panels are believed to be.

Caulking compound, however, does a poor job of sealing deep, narrow cracks, and rapidly deteriorates when exposed to sunlight. In the panel installations heretofore known, the caulking compound is used to seal such cracks and is exposed to sunlight; thus, the sealing is often ineffective. Thus there is a need for a panel interlocking design that does not create narrow, deep cracks and which shields the caulking compound from sunlight.

Another problem in the industry stems from the method used to adhere the metal skins to the foam cores; after adhesive is applied to the core, means are employed to press the metal skins thereagainst while the adhesive cures. Due to the viscosity of the adhesive, there is a low coefficient of friction between the skins and the cores; thus, the skins slip easily and it is difficult to maintain the desired alignment between skin and core. Numerous anti-slipping devices have been created to deal with this problem, but the most common technique is to place a straight board on the edge of the foam and to align the metal skin against it. This involves means for holding the board as well; the technique works, but it adds expense to the panel manufacturing process.

Accordingly, there is also a need for a panel design that facilitates the step of gluing the skins to the core by eliminating the need to employ alignment tools during the adhesion process.

Despite the many attempts heretofore made, there also remains a need for an interlocking panel construction that is easy to lock and which inhibits moisture penetration. More particularly, there remains a need for an interlocking panel design that is structurally simple so that it can be mass produced at low cost yet which is durable and effective.

There is also a need for a versatile design that is easily modified to produce: 1) a very stiff, almost inflexible interconnection means so that the panels are snap fit together only when considerable force is used; 2) a very flexible interconnection means so that the panels are snap fit together when a very light force is used; and 3) an infinite number of interconnection means of varying degrees of flexibility therebetween.

The prior art, considered as a whole, neither teaches nor suggests to those of ordinary skill how the needed cabana panels could be provided.

SUMMARY OF THE INVENTION

This invention is embodied in multiple embodiments. In the first two embodiments, one edge of a panel core is flat, i.e., unsculpted, and its opposite edge is sculpted. In other embodiments, the core of the panel is sculpted at both edges so that the cores of abutting panels mate with one another to help keep out moisture. In all embodiments, the metallic skins of abutting panel edges interlock with one another.

The bends formed in the metallic skins on a first edge of each panel are the same in each embodiment, and the bends formed in a second edge of each panel are the same in each embodiment, said first and second bends having different, but complementary, shapes. The bent parts are resilient and flexible so that they are momentarily displaced from their respective positions of repose during the interlocking procedure, but return to their positions of repose when interlocked. Significantly, when mating panels are being secured to one another, an initial resistance is presented to the assembler; once the resistance has been overcome, the assembler may release the panels because an inherent, built-in bias performs the function of tightly joining the mating edges together after said initial resistance has been overcome. After assembly, if the mating edges are separated by a small distance, they will snap back together upon release.

In the first embodiment, the core at a first edge of a panel, which will hereinafter be referred to as the first core, has a pair of generally square grooves formed therein along its extent. Each groove is in open communication with the top or bottom surface of the panel; thus, a forwardly protruding tongue having square faces is formed between said grooves. Since the top and bottom surfaces of each panel are covered with a metallic skin, each groove is bounded on its outward side by said metal skin.

In said first embodiment, the flat metal skin that forms the first interlocking means extends a predetermined distance that is substantially coplanar with the distal free end of the protruding tongue. The metal skin is bent inwardly, i.e., toward the opposite surface of the panel, at its distal end, at an angle of about ninety degrees; this is the first bend formed in said skin. The bent part extends for about one-fourth the depth of the groove. A second bend, at an angle of about forty five degrees, extends, in approximately equal measure, inwardly, i.e., towards the opposite surface of the panel and rearwardly, i.e., towards the opposite edge of the panel. The extent of the second bend is also about one-fourth the depth of the groove so that the metal skin extends into the groove about one-half the depth thereof. The third bend is arcuate in configuration and is rearwardly directed, i.e., it extends toward the opposite edge of the panel; beginning at the end of the second bend, the curvature extends outwardly toward the surface of the panel and then inwardly toward the opposite surface of said panel. Thus, a dished area is formed.

In the embodiments where the core at the opposite end of the panel is sculptured, which opposite end of the core will be referred to as the second core, said second core also has a pair of grooves formed therein, each of which is in open communication with the top or bottom surface of the panel, but the grooves are not generally square as are the aforementioned grooves formed in the first core. When viewed in side elevation, each groove in the second core has a flat bottom parallel to the edge of the core within which it is formed, and an inner sidewall that projects forwardly, i.e., toward the mating core edge, and outwardly, i.e., toward the top or bottom surface of the core within which it is formed; the angle of inclination is about forty five degrees. Thus, in some embodiments, a forwardly projecting tongue is formed between said two grooves, but the tongue does not have the squared configuration of the first-mentioned tongue; it has a flat outermost surface for abutting the flat outermost surface of the first tongue, but its top and bottom edges are defined by the above-described forwardly and outwardly projecting sidewalls of the grooves which define it. In other embodiments, the outermost surface of the tongue may be rounded to mate with a complementally-rounded recess formed in the mating panel edge.

In all embodiments, the metal skin that covers the top and bottom surfaces of each panel is also bent three times at the second edge of the panel to form a second interlocking means that mates with said first interlocking means. The first bend is an inwardly-directed ninety degrees bend that extends substantially the entire extent of the bottom of the groove. The angle of the second bend is about forty five degrees, in a forward and outward direction so that the skin at least partially overlies the forwardly and outwardly extending inner walls of the groove. The third bend, like the third bend in the first end of the metal skin at the opposite end of the panel, is arcuate in form; however, it extends forwardly, i.e., toward the mating panel edge and not rearwardly, i.e., away therefrom as does its counterpart.

Thus, when mating edges are interconnected, the rearwardly extending arcuate part of the first interconnecting means receives the forwardly projecting arcuate part of the second interconnecting means. This provides a snap fit interconnection that ensures against facile separation of the panels, and also forms a tight seal that inhibits moisture penetration between the interlocked panels. When mating metal edges are brought together, the configuration of the mating edges presents an initial resistance. As the metal flexes, the initial resistance is overcome. The resiliency of the metal and the configuration of the mating parts then drives the mating edges together. If the assembler pulls the mating edges apart without overcoming the resistance that prevents facile separation of the panels, said panels will snap back together as a result of said configuration and resiliency.

The degree of flexibility of the interconnection is increased by decreasing the depth of the beveled grooves formed in the second core, because such decreased depth provides less support to the flexible metal skin that forms the second interconnecting means; increasing the depth of said grooves provides more support and thus decreases the degree of flexibility.

When the initial resistance is overcome and the panels snap together as aforesaid, the mating foam cores will tightly abut one another; there may even be some foam compression. This tight connection is achieved without misaligning the seam. In a second and other embodiments, the contour of the generally square tongue formed in the first edge of the core is changed by beveling its top and bottom surfaces; this facilitates interconnection of the mating parts by a technique known as "rock and lock" whereby a first panel is held at an oblique angle to an already-installed second panel when the respective interconnecting means are first partially joined, and said first panel is then brought into the same plane as the second with a rocking action to lock the respective interconnecting means to one another. The novel contour also facilitates the "straight on" interconnection of adjacent panels where clearance problems prohibit the rock and lock installation procedure. Moreover, the novel contour facilitates a third type of installation procedure known as "scissors" installation where abutting panels are first interlocked at a first end, and the panel being installed is moved in a scissoring action to bring it into locking engagement with the already-installed panel.

Advantageously, the design of the second interconnecting means serves to align the metal skin during the pressing process used during the adhesion process because the bends formed in said skin provides a straight, self-aligning edge that positions the metal skin square to the core, as will become more clear when the invention is described in detail.

Moreover, the novel design shields caulking compound from sunlight, thereby substantially lengthening its effective lifetime.

Thus, it is now apparent that the primary object of this invention is to provide interlocked cabana panels having a structural simplicity that enables their mass production at low cost but which provides a unique, biased interlocking means that holds interlocked panels together against facile separation.

Another important object is to provide panels that are strongly interlocked so that they cannot be separated easily.

Still another important object is to provide a design whereby the flexibility of the interconnection may be easily increased or decreased.

Other important objects include the provision of the above-mentioned self-alignment means and the means for protecting the caulking compound.

Another important object includes the provision of a self-biasing interlocking means that brings the foam cores of adjacent panels into tightly abutting relation to one another without misaligning the seam formed by the abutting panels.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
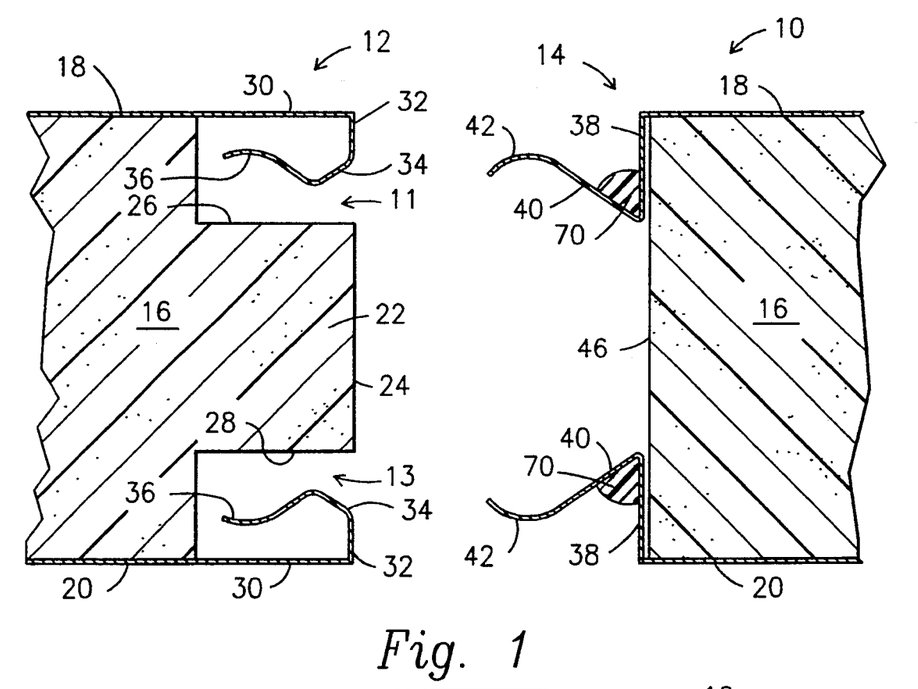
FIG. 1 is a cross sectional, end view showing a first embodiment of the panels in their spaced apart configuration.

Referring now to FIG. 1, it will there be seen that a pair of side edge-interlockable modular panels are denoted as a whole by the reference numeral 10. The first and second panel edges are denoted 12 and 14, although it should be understood that edges 12 and 14 are opposite side edges of the novel panel; the panels are placed in side-by-side relation to one another when a roof or wall is assembled, and the FIGS. therefore depict abutting panel edges.

Panel 10 has an EPS foam core 16, although cores other than EPS are within the scope of this invention. Core 16 is protected by a metallic skin; the top skin is denoted 18 and the bottom is denoted 20. Both skins have the same construction and this designation of top and bottom is relative and merely for convenience; the skins are bonded to their respective top and bottom surfaces of core 16 by any suitable adhesive.

Referring first to the first side edge of panel 10, denoted 12 as aforesaid, it will be noted that the vertical edge thereof has a pair of generally square grooves 11 and 13 formed therein along its extent, each groove being in open communication with the top or bottom surface of the panel. Forwardly protruding tongue 22 is therefore formed between said grooves; it includes a flat, forward surface 24 and flat top and bottom walls 26 and 28, respectively. As used herein, the term "forward" refers to the direction toward the mating panel edge, and the term "rearward" refers to the direction away from the mating panel edge.

In this embodiment, the respective forwardmost extents of flat metal skins 18 and 20 are coplanar with the distal free end of tongue 22. Each skin 18 and 20 includes flat part 30 that is unbent and which extends in cantilevered relation to the grooved end of the panel. Three bends are formed in the distal free end of unbent part 30 to form the first interconnecting means. The first bend is a ninety degree, inwardly directed bend, i.e., the skin extends toward the opposite surface of the panel. The first bent part is denoted 32; it extends about one-fourth the depth of its associated groove 11 or 13. A second bent part, denoted 34, is bent at an angle of about forty five degrees and extends, in approximately equal measure, inwardly, i.e., towards the opposite surface of the panel, and rearwardly. The extent of the second bent part 34 is also about one-fourth the depth of the groove so that the metal skin extends into the groove about one-half the depth thereof. The third bend is arcuate in configuration and the third bent part 36 is rearwardly directed. Beginning at the trailing end of the second bent part 34, each curvature 36 extends outwardly toward the nearest surface of the panel and then inwardly toward the opposite surface of said panel. Thus, a flexible and resilient first interconnecting means is formed.

The leading (forward) end of the metal skin that covers the top and bottom surfaces of all embodiments of second panel edge 14 is also bent three times. The first bend is an inwardly-directed ninety degrees bend; it forms first bent part 38 that overlies the edge of the panel. The angle of the second bend is about forty five degrees so that second bent part 40 extends in a forward and outward direction. The third bend, like the third bend in the first end of the metal skin at the opposite end 12 of the panel, provides third bent part 42 which is arcuate in form; however, it extends forwardly and not rearwardly as does its counterpart.

Figure 2:
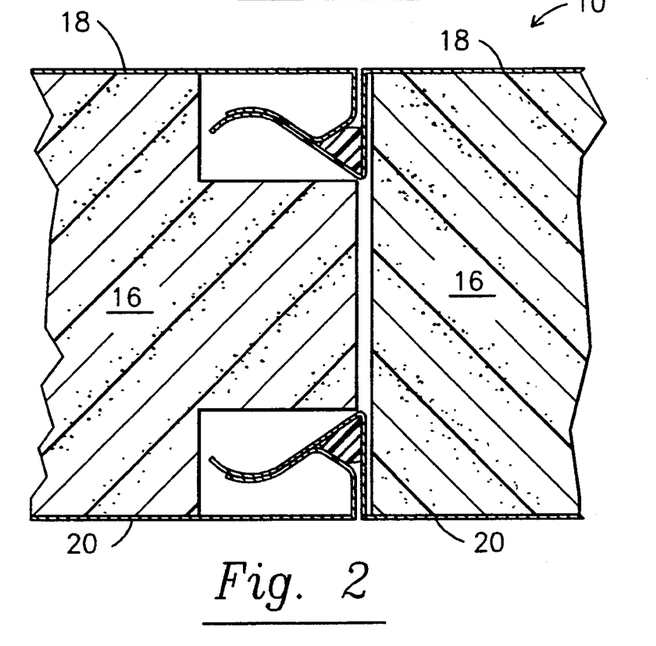
FIG. 2 is a cross sectional, end view showing the panels of FIG. 1 in their interlocked configuration.

Thus, when mating panel edges are interconnected, the rearwardly extending arcuate part 36 of the first interconnecting means receives the forwardly projecting arcuate part 42 of the second interconnecting means. This provides a snap fit interconnection that ensures against facile separation of the panels, and also forms a tight seal that inhibits moisture penetration between the interlocked panels.

Figure 3:
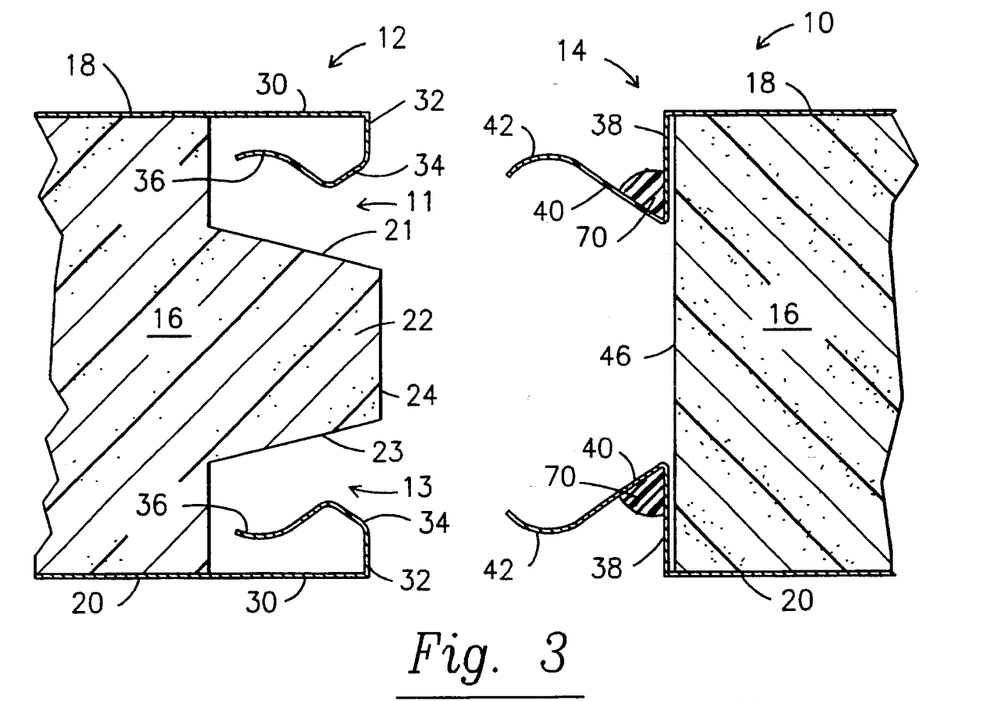
FIG. 3 is a cross sectional, end view showing a second embodiment of the panels in their spaced apart configuration.
Figure 4:
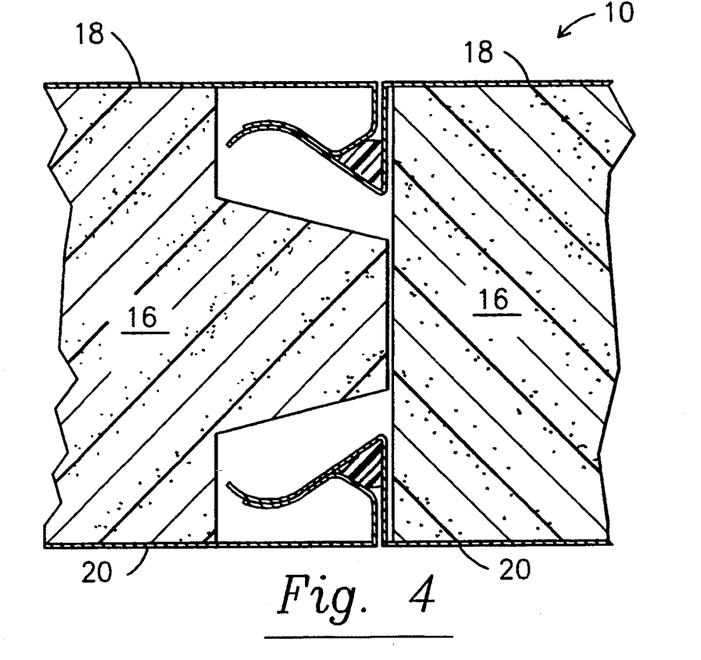
FIG. 4 is a cross sectional, end view showing the panels of FIG. 3 in their interlocked configuration.

In a second embodiment, shown in FIGS. 3 and 4, the contour of tongue 22 is changed by bevelling its top and bottom surfaces as at 21, 23; this facilitates interconnection of the mating panel edges 12 and 14 by a technique known as "rock and lock" whereby a first panel is held at an oblique angle to a second panel when the respective interconnecting means are first partially joined, and said first panel is then brought into the same plane as the second with a rocking action to lock the respective interconnecting means to one another. As mentioned earlier, it also facilitates conventional "straight on" and "scissoring" installation techniques.

Figure 5:
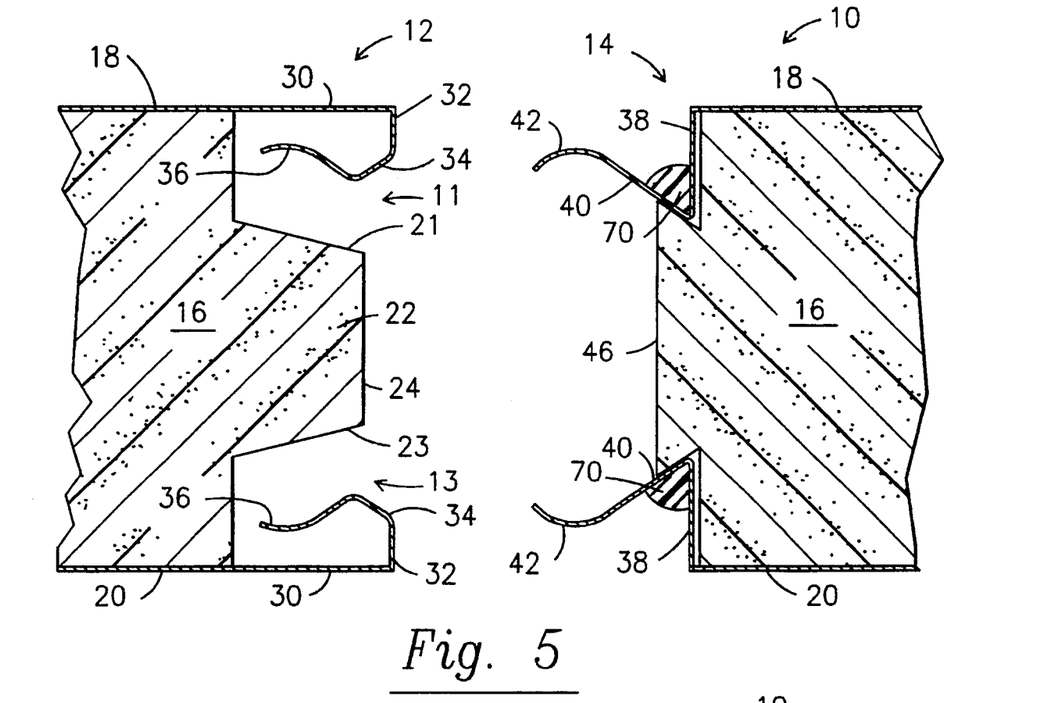
FIG. 5 is a cross sectional, end view showing a third embodiment of the panels in their spaced apart configuration.
Figure 6:
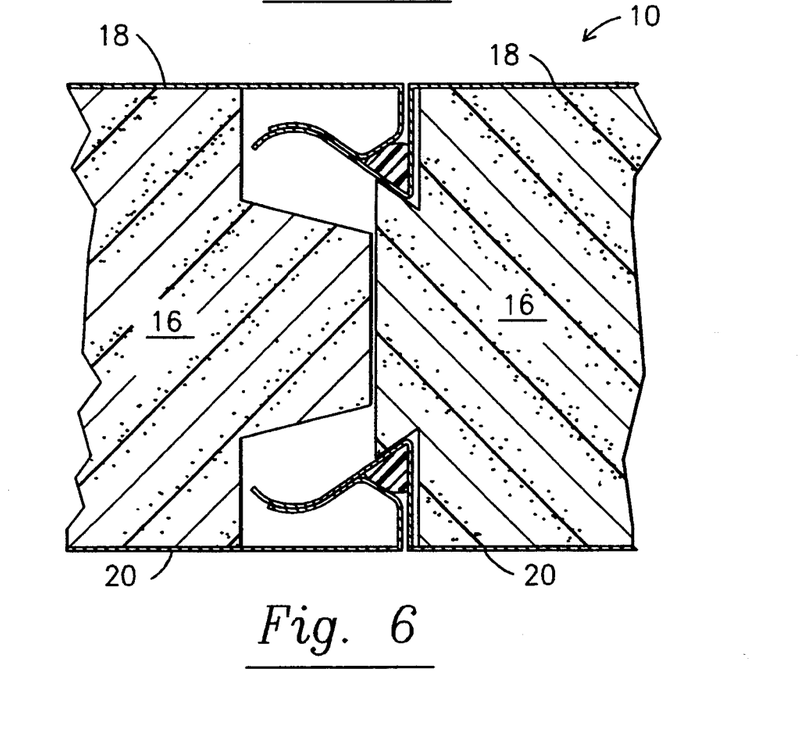
FIG. 6 is a cross sectional, end view showing the panels of FIG. 5 in their interlocked configuration.

In a third embodiment, depicted in FIGS. 5 and 6, the second edge 14 of each panel also has a pair of grooves formed therein, each of which is in open communication with the top or bottom surface of the panel. When viewed in side elevation, each groove formed in end 14 of panel 10 has a flat bottom parallel to the forward edge of core 16, said flat bottom being disposed in underlying relation to first bent part 38, and an inner sidewall that projects forwardly and outwardly, i.e., toward forwardly projecting tongue 22 of its mating core edge 12, and toward the top or bottom surface of the core, said inner sidewall being disposed in underlying relation to second bent part 40, at least to some extent. The angle of inclination is about forty five degrees. Thus, forwardly projecting tongue 44 having flat leading surface 46 is formed between said two grooves.

It is important to note that the interconnecting means formed by integral parts 38, 40, and 42 of the embodiments of FIGS. 1–4 is the same as that of FIGS. 5 and 6, but that the provision of tongue 46 decreases the flexibility of said interconnecting means; note that the base of second bent part 40 is supported by its underlying groove sidewall in the latter group of Figs., but no such support is provided in the former group of Figs. Thus, the panels of FIGS. 1–4 will snap together more easily than the panels of FIGS. 5 and 6, but the seam between the panels will not be as tight.

Thus, it should be understood that the degree of flexibility of the interconnection is maximized by eliminating all support for bent part 40. It should be further realized that said degree of flexibility is increased in those embodiments where core 16 is grooved in the manner illustrated in FIGS. 5 and 6 by decreasing the depth of the beveled grooves so that the amount of support provided to bent part 40 is minimized.

Figure 7:
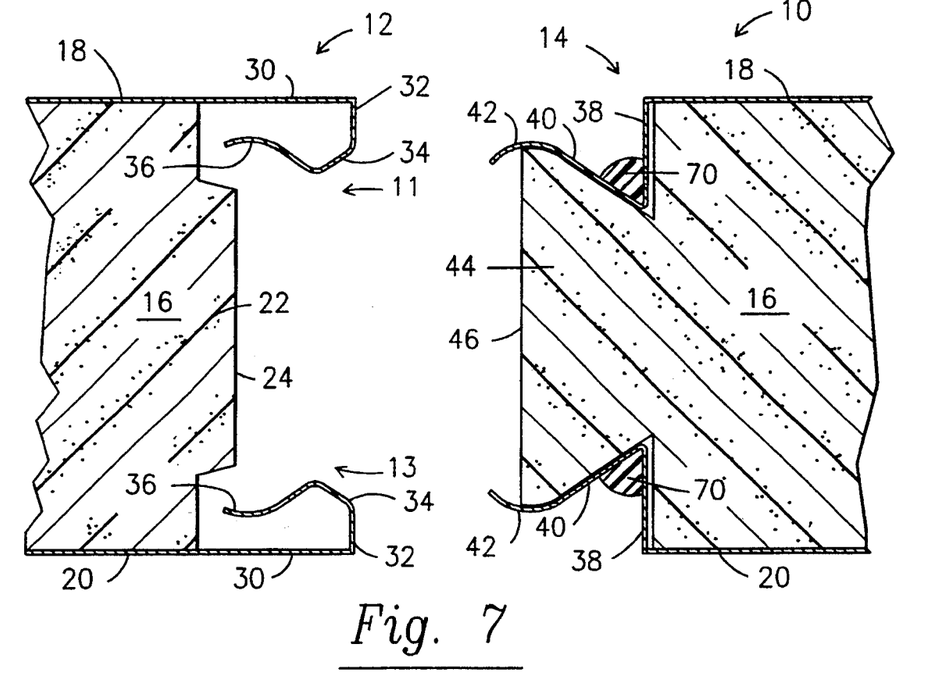
FIG. 7 is a cross sectional, end view showing a fourth embodiment of the panels in their spaced apart configuration.
Figure 8:
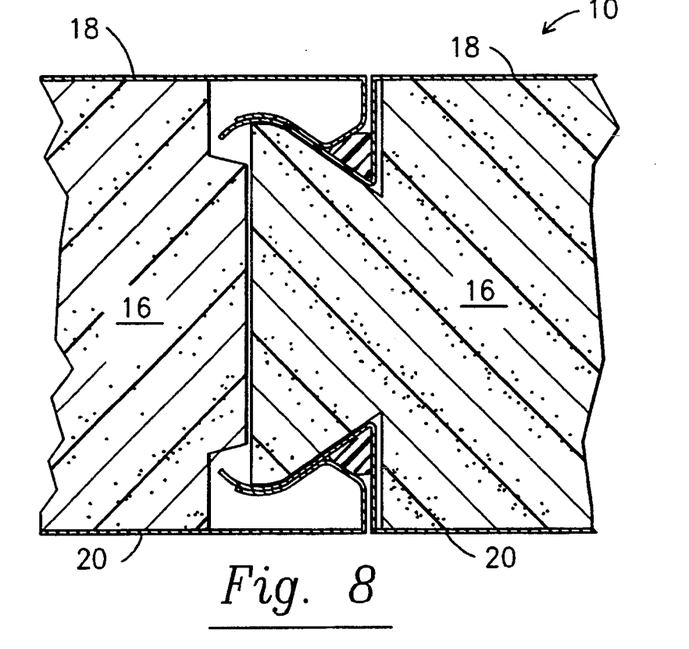
FIG. 8 is a cross sectional, end view showing the panels of FIG. 7 in their interlocked configuration.

As shown in FIGS. 7 and 8, an increase in groove depth provides more support to bent part 40, thereby decreasing the flexibility of the interconnecting means formed by parts 38, 40, and 42. A relatively large amount of force is required to join panels having the interlocking means of FIGS. 7 and 8, but the seam therebetween is exceptionally tight.

Note by comparing FIGS. 5 and 6 with FIGS. 7 and 8 that as tongue 44 of second panel end 14 protrudes more, tongue 22 of first panel end 12 protrudes less. Note further that the respective leading flat surfaces 24, 46 of tongues 22, 44 abut one another but do not otherwise interlock.

In the embodiments of FIGS. 9–14, the abutting cores 16 of the panels are complementarily sculpted so that they interlock, thereby enhancing the moisture-sealing properties of the panels.

Figure 9:
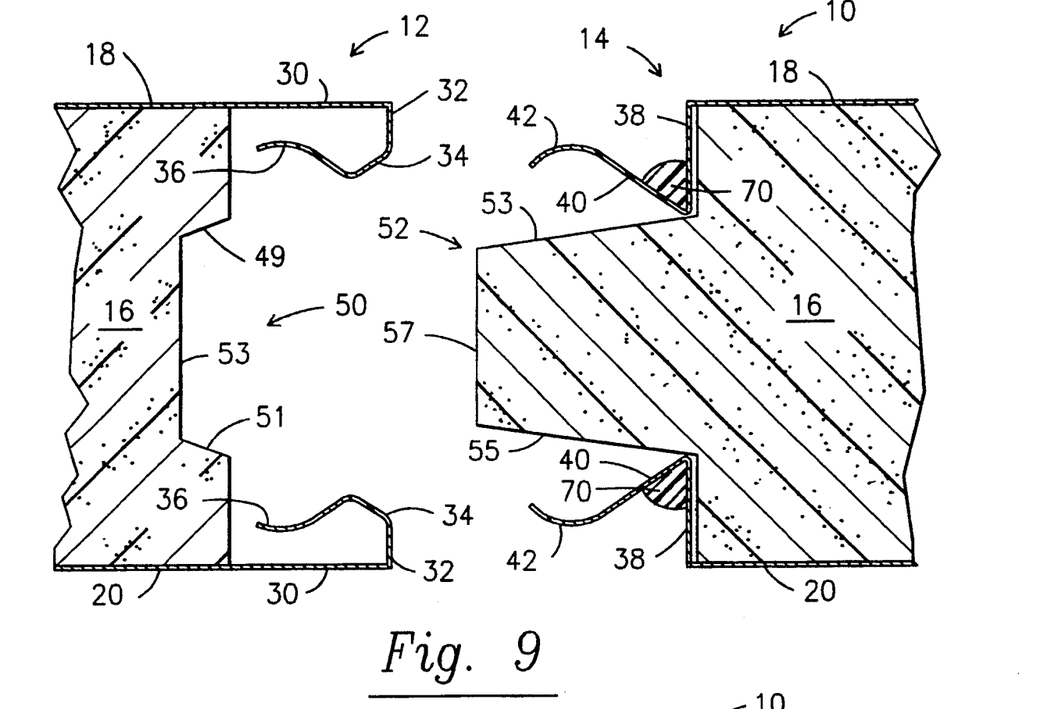
FIG. 9 is a cross sectional, end view showing a fifth embodiment of the panels in their spaced apart configuration.
Figure 10:
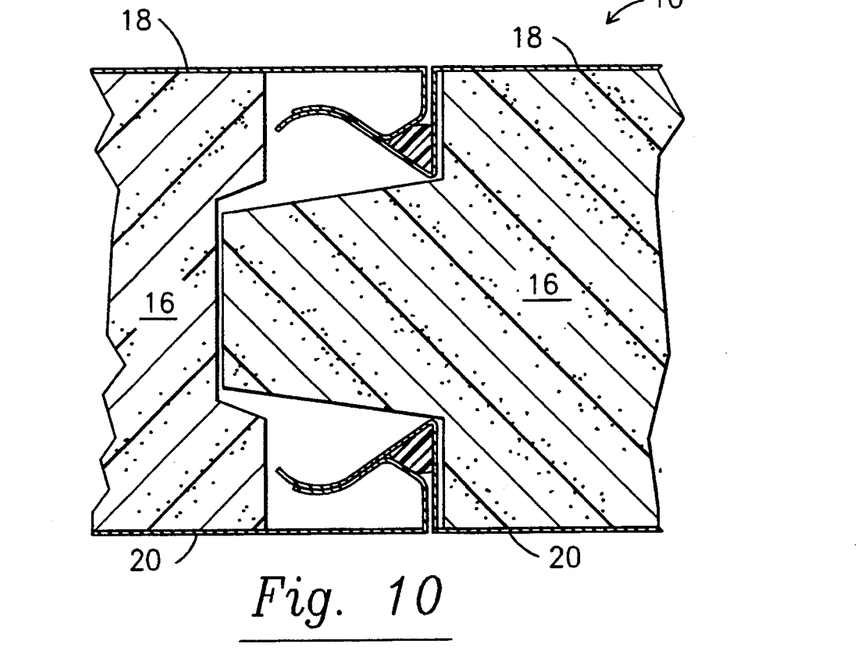
FIG. 10 is a cross sectional, end view showing the panels of FIG. 9 in their interlocked configuration.

In FIGS. 9 and 10, a groove 50 having bevelled sidewalls 49, 51 and flat bottom 53 is formed in the core of first panel end 12, and a complementally-shaped tongue 52 having bevelled sidewalls 53, 55 and flat leading surface 57 is formed in the core of second panel end 14. A mirror image of the same configuration is also within the scope of this invention, i.e., the tongue may be formed in panel end 12 and the groove in panel end 14. Note that said configurations provide no support for the interconnecting means formed by parts 38, 40, and 42, thereby providing very facile interconnection of abutting panel edges.

Figure 11:
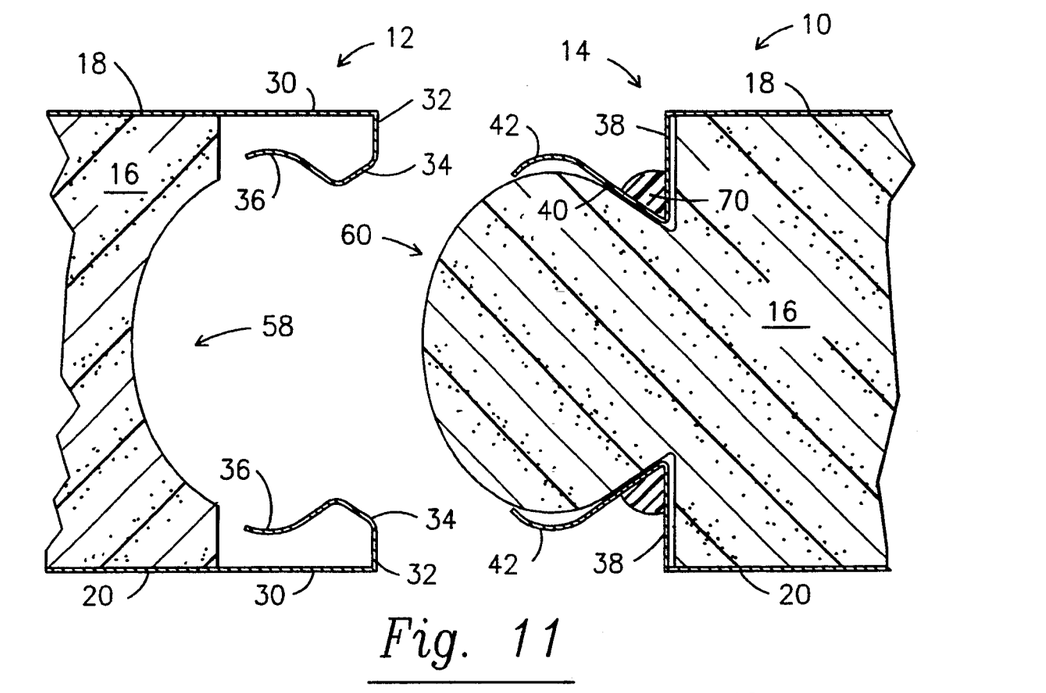
FIG. 11 is a cross sectional, end view showing a sixth embodiment of the panels in their spaced apart configuration.
Figure 12:
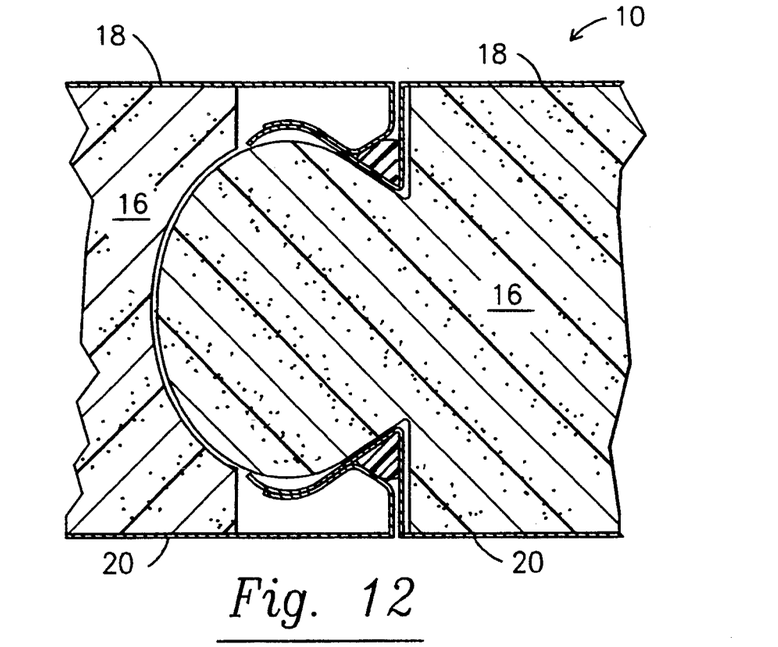
FIG. 12 is a cross sectional, end view showing the panels of FIG. 11 in their interlocked configuration.

The embodiment of FIGS. 11 and 12, however, provides full support for said second interconnecting means, and thus provides a very tightly sealed joint between abutting panels. The respective cores 16 are interlocked in the manner shown, i.e., a semicircular groove 58 is formed in first panel end 12 and a mating tongue 60 is formed in second panel end 14.

Figure 13:
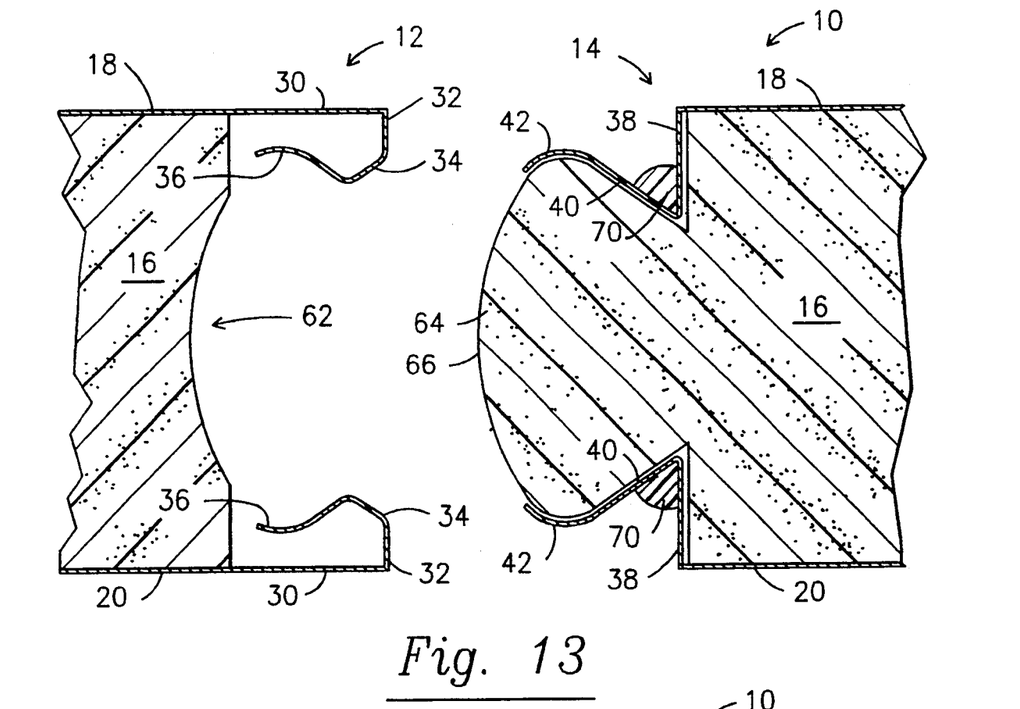
FIG. 13 is a cross sectional, end view showing a seventh embodiment of the panels in their spaced apart configuration.
Figure 14:
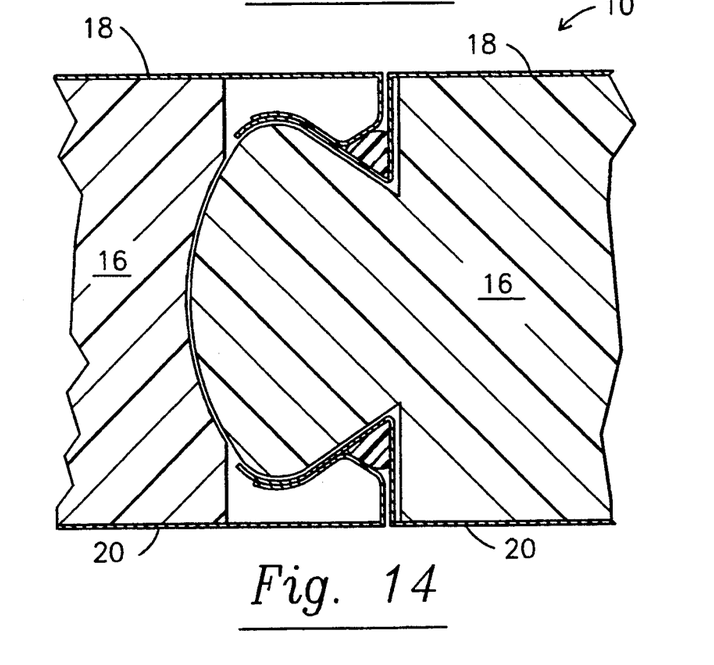
FIG. 14 is a cross sectional, end view showing the panels of FIG. 13 in their interlocked configuration.

A variation on the embodiment of FIGS. 11 and 12 is shown in FIGS. 13 and 14; tongue 64 has an arcuate leading surface 66, and groove 62 is complementally formed. Note that the interconnecting means associated with panel end 14 is fully supported in this embodiment as well.

In all embodiments, an elongate bead of caulking 70 is deposited along the extent of the interconnecting means formed by parts 38, 40, 42 to enhance the seal against moisture penetration. More particularly, the caulking is applied in the space defined by the acute angle formed between parts 38 and 40, as shown in all of the Figs., before the mating panel edges 12 and 14 are joined. Those having knowledge of the properties of caulking will note that said space is neither deep and narrow, nor is it wide and shallow; thus, it is the type of space where caulking works best. Moreover, note that when the panel edges have been joined, as depicted in the even-numbered Figs., the caulking is protected from sunlight and hence from destructive ultraviolet rays. Thus, the constructions shown herein are substantially water and moisture-proof for a much longer period of time than those constructions where the caulking is exposed to the elements.

Still another advantage of the novel construction is the fact that the interconnecting means formed by parts 38, 40, and 42 serves to align the metal skins 18 and 20 with respect to core 16 when said skins are being adhered to said core. Skins 18, 20 tend to slide with respect to core 16 when said skins are pressed against said core during the adhesive-curing process. Most panel manufacturers place straight boards or other devices against the panel sides to keep the skins from sliding during the pressing process, but such expedients are cumbersome and add considerable expense to the panel-making process. However, the skins are automatically aligned and held against slippage by the configuration of said parts 38, 40, and 42.

Moreover, as mentioned earlier, all of the unique configurations of the mating metallic edges disclosed herein provide the world's first self-biasing interlocking means. The installer needs merely to overcome the initial resistance presented by the interlocking means, and the novel configurations and inherent resiliency of the metallic skins do the rest of the work. Advantageously, this eliminates sloppy installations, well known to the art, where an installer is careless when bringing prior art, non-self-biased mating edges together and leaves a gap between mating panel edges. The novel configurations automatically eliminate such gap, thereby converting careless installers into apparent skilled artisans.

Yet another advantage is provided by the ability to change the angle between parts 38 and 40. As should be apparent from the drawings, as said angle increases, the force required to bring mating edges together, or to separate them, decreases. As said acute angle is made even more acute, the force required to join and separate the mating edges increases. Thus, the novel panels are the first metal skin, foam core panels, anywhere in the world, having interlocking mating edges with adjustable resistance to coupling and decoupling.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An interlocking means for joining together, at first and second opposite edges thereof, modular panels of the type having a core of a predetermined material and a metallic skin for covering top and bottom surfaces of said core, comprising:

first and second interlocking means for interlocking said metallic skins to one another;

said first interlocking means including a first end of a metallic skin, said first end having a first flat part adhered to the core which it overlies, a second flat part that is integral to said first flat part and disposed in coplanar relation therewith, said second flat part extending in cantilever relation to said core and having a distal free end;

said distal free end of said second flat part having three bends formed therein;

a first bend of said three bends being a substantially ninety degree bend and defining a first bent part that extends a predetermined distance towards a center of said core, said first bent part overlying the first edge of said core;

a second bend of said three bends being a substantially forty five degree bend and defining a second bent part that extends a predetermined distance generally towards said center of said core and generally away from a first edge of said core;

a third bend of said three bends having a substantially arcuate configuration and defining a third bent part that extends a predetermined, rearwardly-extending distance relative to said first edge, said third bend extending in substantially parallel relation to the top and bottom surfaces of said core;

said second interlocking means being formed complimentarily to said first interlocking means;

said first and second interlocking means being flexible so that they are transiently displaced from respective positions of repose when they are brought into interlocking relation to one another, and being resilient so that they substantially return to said respective positions of repose when the interlocking process has been completed;

said first and second interlocking means snapping together after an initial resistance to interlocking has been overcome, under a self-bias created by the resiliency and configuration of the metallic skin, said self-bias bringing mating cores tightly together and forming a seam between mating panels that is not misaligned;

a second end of said metallic skin having a first flat part adhered to the core which it overlies;

said second end also having a second part having three bends formed therein, said second part not being adhered to its associated core;

a first bend of said bends being a substantially ninety degree bend and defining a first bent part that extends a predetermined distance towards a center of said core, said first bent part overlying the second edge of said core;

a second bend of said three bends being a substantially forty five degree bend and defining a second bent part that extends a predetermined distance generally away from said center of said core and generally away from said second edge of said core;

a third bend of said three bends having a substantially arcuate configuration and defining a third bent part that extends a predetermined, forwardly-extending distance relative to said second edge, said third bend extending in substantially parallel relation to the top and bottom surfaces of said core;

the first end of said core being sculpted to provide a forwardly-extending tongue, said tongue extending a predetermined distance, said tongue formed by a pair of grooves formed in top and bottom surfaces of said core, each groove of said pair of grooves being in open communication with its associated top or bottom surface, and said second and third bent parts of said first interlocking means extending into their associated grooves;

said second core end being sculpted, there being a pair of grooves of uniform predetermined depth formed in said second core end, defining a forwardly-projecting tongue of predetermined extent therebetween, each of said grooves being in open communication with its associated top or bottom surface of said core, and each of which is formed by a bevelled sidewall and a flat bottom wall, each of said bevelled sidewalls being sloped at an approximate forty five degree angle relative to said top and bottom surfaces and at least partially supporting said second bent part of said second interlocking means, said second bent part having increased support as the respective depths of said grooves increases, said increased support decreasing the flexibility of said second interconnecting means.

2. The interlocking means of claim 1, wherein the first end of said core is sculpted to provide a readwardly-extending groove having a flat bottom and sloping sidewalls, said groove having a predetermined depth, wherein the second end of said core is sculpted to provide a forwardly-extending tongue, said tongue formed by a pair of grooves formed in top and bottom surfaces of said core, each groove of said pair of grooves being in open communication with its associated top or bottom surface, and said tongue having bevelled top and bottom surfaces that slope away from said second interconnecting means so that said second interconnecting means is unsupported, said bevelled top and bottom surfaces mating with the sloped sidewalls of said groove formed in said first end of said core.

3. The interlocking means of claim 1, wherein the first end of said core is sculpted to provide a rearwardly-extending, semi-circular groove, said groove having a predetermined depth, wherein the second core is sculpted to provide a forwardly-extending, semi-circular tongue, said tongue flanked at its top and bottom by a pair of grooves formed in top and bottom surfaces of said core, each groove of said pair of grooves being in open communication with its associated top or bottom surface of said core, each of said grooves being formed by an angled sidewall and a flat bottom wall, each of said angled sidewalls being sloped at an approximate forty five degree angle relative to said top and bottom surfaces and said angled sidewalls of said tongue at least partially supporting said second bent part of said second interconnecting means.

4. The interlocking means of claim 1, further comprising an elongate bead of caulking compound disposed in a space defined by an angle between said first and second bent parts.

5. The interlocking means of claim 1, wherein an increase in said forty five degree bend decreases resistance to coupling and uncoupling of adjacent interlocking panels and wherein a decrease in said forty five degree bend increases resistance to coupling and uncoupling of adjacent interlocking panels.

6. An interlocking means for joining together, at opposing first and second edges thereof, modular panels of the type having a core of a predetermined material and a metallic skin for covering top and bottom surfaces of said core, comprising, first and second interlocking means for interlocking said metallic skins to one another, said first interlocking means being formed in a first end of said metallic skin and said second interlocking means being formed in a second end of said metallic skin;

said second interlocking means being formed complimentarily to said first interlocking means;

said first and second interlocking means being flexible so that they are transiently displaced from respective positions of repose when brought into interlocking relation to one another, and being resilient so that they substantially return to said respective positions of repose when the interlocking process has been completed;

said first and second interlocking means snapping together after an initial resistance to interlocking has been overcome, under a self-bias created by the resiliency and configuration of the metallic skin, said self-bias bringing mating cores tightly together and forming a seam between mating panels that is not misaligned;

said second end of said metallic skin having a first flat part adhered to the core which it overlies;

a second part having three bends formed therein, said second part not being adhered to its associated core;

a first bend of said three bends being a substantially ninety degree bend and defining a first bent part that extends a predetermined distance towards a center of said core, said first bent part overlying the second edge of said core;

a second bend of said three bends being a substantially forty five degree bend and defining a second bent part that extends a predetermined distance generally away from said center of said core and generally away from said second edge of said core;

a third bend of said three bends having a substantially arcuate configuration and defining a third bent part that extends a predetermined, forwardly-extending distance relative to said second edge, said third bend extending in substantially parallel relation to the top and bottom surfaces of said core;

the first end of said core being sculpted to provide a forwardly-extending tongue, said tongue extending a predetermined distance, said tongue formed by a pair of grooves formed in top and bottom surfaces of said core, each groove of said pair of grooves being in open communication with its associated top or bottom surface, and said second and third bent parts of said first interlocking means extending into their associated grooves;

said second core end being sculpted, there being a pair of grooves of uniform predetermined depth formed in said second core end, defining a forwardly-projecting tongue of predetermined extent therebetween, each of said grooves being in open communication with its associated top or bottom surface of said core, and each of which is formed by a bevelled sidewall and a flat bottom wall, each of said bevelled sidewalls being sloped at an approximate forty five degree angle relative to said top and bottom surfaces of said core and at least partially supporting said second bent part of said second interlocking means, said second bent part having increased support as the respective depths of said grooves increases, said increased support decreasing the flexibility of said second interconnecting means.

7. The interlocking means of claim 6, wherein the first end of said core is sculpted to provide a rearwardly-extending, semi-circular groove, said groove having a predetermined depth, wherein the second core is sculpted to provide a forwardly-extending, semi-circular tongue, said tongue flanked at its top and bottom by a pair of grooves formed in top and bottom surfaces of said core, each groove of said pair of grooves being in open communication with its associated top or bottom surface of said core, each of said grooves being formed by an angled sidewall and a flat bottom wall, each of said angled sidewalls being sloped at an approximate forty five degree angle relative to said top and bottom surfaces and said angled sidewalls of said tongue at least partially supporting said second bent part of said second interconnecting means.

8. The interlocking means of claim 6, wherein the predetermined extent of said tongue associated with said first end of said core is decreased as the predetermined extent of the tongue associated with said second end of said core is increased.

* * * * *